(12) United States Patent
Hepler

(10) Patent No.: US 7,954,172 B2
(45) Date of Patent: Jun. 7, 2011

(54) GARMENT FOR RETAINING A CHILD IN A CAR-SEAT

(76) Inventor: Natalie Ann Hepler, Mt. Pleasant, UT (US)

( * ) Notice: Subject to any disclaimer, the term of this patent is extended or adjusted under 35 U.S.C. 154(b) by 315 days.

(21) Appl. No.: 12/269,034

(22) Filed: Nov. 11, 2008

(65) Prior Publication Data

US 2010/0115685 A1   May 13, 2010

(51) Int. Cl.
*A41D 11/00* (2006.01)
*A41D 1/04* (2006.01)
(52) U.S. Cl. ................................. 2/75; 2/115
(58) Field of Classification Search ............ 2/102, 49.3, 2/51, 48, 75, 80, 111, 115, 108, 114, 69, 2/247, 118, 46, 52, 44, 45, 460, 92, 93, 94; 297/465, 487, 488, 219.12, 256.15; 128/874, 128/875, 869
See application file for complete search history.

(56) References Cited

U.S. PATENT DOCUMENTS

| | | | |
|---|---|---|---|
| 3,605,119 A * | 9/1971 | Cherry | 2/88 |
| 4,437,628 A * | 3/1984 | Schwartz | 244/122 AG |
| 4,759,569 A * | 7/1988 | Potter | 280/748 |
| 4,832,053 A * | 5/1989 | McCarthy | 128/869 |
| 5,072,457 A * | 12/1991 | Aronne | 2/102 |
| 5,161,258 A * | 11/1992 | Coltrain | 2/102 |
| 5,247,707 A * | 9/1993 | Parker et al. | 2/102 |
| 5,301,371 A | 4/1994 | Chao | |
| 5,429,418 A * | 7/1995 | Lipper et al. | 297/465 |
| 6,230,329 B1 * | 5/2001 | Jennings | 2/114 |
| 6,408,439 B1 | 6/2002 | Garforth-Crippen | |
| 6,449,770 B1 * | 9/2002 | Taylor et al. | 2/69 |
| 6,796,584 B1 * | 9/2004 | Hernandez | 280/801.1 |
| 7,131,703 B1 * | 11/2006 | Sheridan et al. | 297/465 |
| 7,225,472 B2 * | 6/2007 | McDonald et al. | 2/102 |
| 7,384,098 B1 | 6/2008 | Allwin | |
| 7,472,964 B2 * | 1/2009 | King | 297/465 |
| 2005/0017566 A1 | 1/2005 | Rizk | |
| 2007/0017001 A1 * | 1/2007 | Wagner et al. | 2/102 |
| 2008/0252132 A1 * | 10/2008 | Thomson | 297/465 |

* cited by examiner

*Primary Examiner* — Amy B Vanatta
(74) *Attorney, Agent, or Firm* — F. Chad Copier; Casey B. Harris

(57) ABSTRACT

The present invention discloses a garment that is designed to prevent a child in a car-seat from removing his or her arms from the shoulder straps that are part of the modern 5-point harness system found in most car-seats. The garment is configured like a jacket, through the front of which the shoulder straps are threaded, allowing for access to the front closure hasp of the harness and ensuring the closure hasp is across the upper chest, while comfortably restricting the child's movement out of the straps by virtue of the sleeves of the garment which are now made part of the harness system itself.

12 Claims, 3 Drawing Sheets

GARMENT FOR RETAINING A CHILD IN A CAR-SEAT

BACKGROUND

Many parents of children have dealt with the struggle and unsafe situation that is created by a child who is easily able to wriggle out of the harness system that keeps the child in his or her car seat. While the harness system in newer-model car seats is intended to keep the child in the seat, even if the straps of the harness are securely fastened, more agile children are able to bring their arms out from under the straps and create a dangerous situation that can distract the driver of the car and cause potential harm to the child. In addition, many parents unknowingly place the chest closure of a typical 5-point harness system too low on their child, and not on the upper chest, where manufacturers recommend the closure be placed for maximum safety. What is needed is a solution to these problems that is cost-effective, safe, and compatible with most car seats.

Previous attempts at solving this problem have been made. U.S. Pat. No. 6,408,439 discloses a garment for use in a car seat, yet does not provide for the integration of the car seat straps within the garment itself. U.S. Pat. No. 5,301,371 discloses a type of vest to be used with a seat belt, but is not specially configured to fit the modern 5-point child seat harness system. Also, U.S. Patent Application Publication Number 2005/0017566 discloses an outerwear jacket made to be worn in cold weather, which facilitates the placing of car seat straps around the jacket without having to remove the outerwear thus subjecting the wearer to cold. However, this reference suffers from disadvantages, among them being the fact that the jacket assembly is complicated and not specifically directed to the problem above.

The present disclosure, however, relates to a jacket-type garment which remains in the car seat at all times and attached to the harness system of the seat. The garment is then ready at all times, and is put on a child when in the car seat to secure the child's arms in the seat. The harness system is then fastened as recommended by the manufacturer of the car seat, and the child, because the garment is attached to the harness system and retains the child within the garment, cannot remove his or her arms from the garment and also, by extension, the car seat harness straps.

SUMMARY

The present invention is directed to a garment that satisfies the above-stated need, which is to provide a means whereby a child cannot wriggle out of a car seat. The invention comprises a jacket-type garment without a front closure that consists of closed sleeves, and is of a size large enough to admit the torso and arms of the child for whom the car seat is required. The front of the garment consists of four attached admittances for the shoulder straps of the typical 5-point child seat harness, the admittances located two on each side of the front opening of the jacket, one above the other. These admittances allow for the shoulder strap portion of the 5-point harness to be threaded through them, which makes the jacket a permanent addition to the harness system. The admittances are in pairs of two such that the closure hasp between the two shoulder straps is still exposed and available for securing once the child has been placed in the garment. The remainder of the 5-point harness system—the two leg straps and the associated buckle located on the crotch strap—is then still available to be fastened as without the garment.

The shoulder straps of the harness can be threaded through the garment for initial placement by using the same process as the manufacturer of the car seat recommends for moving the straps between slots in the back of the car seat (for height adjustment). The straps are unhooked from the rear of the car seat, and then threaded through the admittances of the garment, which admittances are made wide enough to also allow the closure hasp to pass through on the way to its final position between the two admittances on each side of the front opening of the garment. The straps are then passed through the slots on the back of the car seat, and reattached in the back of the seat.

To place the child in the newly-equipped child seat, the child is seated in the car seat as usual, and then her arms are placed in the sleeves of the garment so that she is now wearing the garment. The closure hasp in the front of the garment is then fastened, and the bottom part of the 5-point assembly is fastened as usual. This unique approach to the problem of a child slipping her arms out from underneath her shoulder straps now restricts the movement of the child's arms since the placement of the shoulder straps through the garments does not allow her to move her arms under the straps. This keeps the child in her car seat, appropriately and comfortably restrained by the 5-point harness. To remove the child from the car seat, the harnesses are unfastened and the child is assisted in removing her arms from the sleeves of the garment. The garment remains in place on the car seat.

Of course, various different configurations of the described garment are possible and anticipated by this application. The garment may be made of different colors and patterns suitable for use by children of different sexes, and may also be made of different weights of material for the different seasons of the year or for comfort in various climates. The sleeves of the garment may be also full or short, the front of the garment may have different types of closures (or none at all), and the garment may be fabricated in different sizes to be comfortable for children of various heights and weights. Likewise, the admittances for the shoulder straps on the garment may also be of different configurations, such as consisting of one piece of sewn-on material with a cut-out for the closure hasp along each side of the jacket instead of the aforementioned two pieces, as long as the primary purpose of the invention is retained.

Some special advantages that are inherent in the design of this garment include that this will make seating special-needs children in car seats a more comfortable and secure experience, as well as the fact that the design of the admittances for the shoulder straps of the car seat will allow the chest closure of the car seat harness system to be located in the correct place. Many parents neglect to adjust this clasp to be in the recommended position, which is up on the upper chest of the child, and instead allow the clasp to be closed along the lower chest or even stomach of the child. By using the space in between the shoulder strap admittances on the garment, the chest clasp is located in the correct and safest position, ensuring the child's safety and comfort in the seat.

BRIEF DESCRIPTION OF THE DRAWINGS

These and other features, aspects, and advantages of the present invention will become better understood with regard to the following description, appended claims, and accompanying drawings where:

DESCRIPTION

Figure 1:
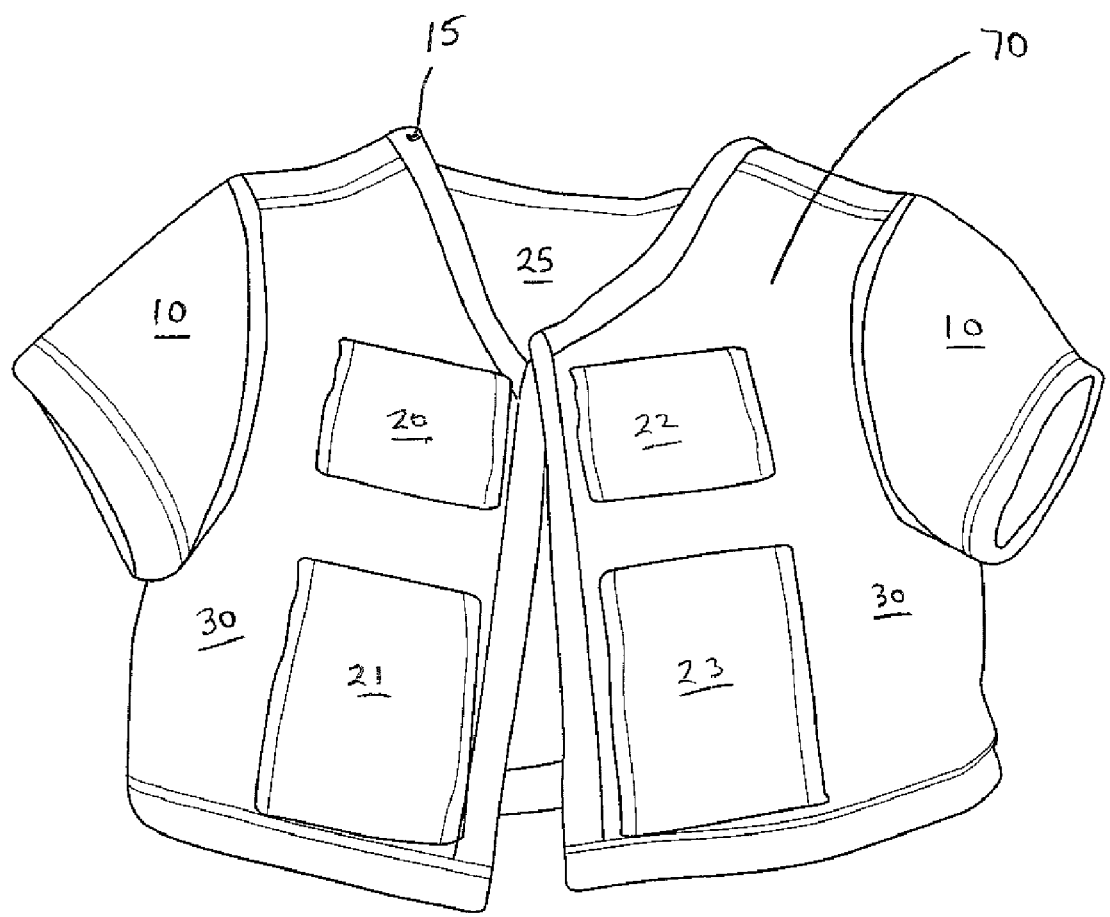
FIG. 1 shows a view of the garment as it appears from the front.

The garment 70 can be constructed of various materials, and may be assembled in a variety of ways. For purposes of this application, the garment 70 will be referred to as being constructed of different parts as follows, as depicted in FIG. 1: two sleeves 10 may be long or short, and are attached permanently to a back piece 25 of the garment 70, and to front sides 30 of the garment 70, each front side 30 is also connected permanently to the back piece 30 so as to resemble a typical button-up shirt or jacket. A collar 15 may be optional depending on comfort and design considerations, and the garment 70 may also be made of different colors to accommodate children of different sexes or of different sizes to accommodate children of different heights and weights. The front sides 30 may be connected with an optional closure 31 (not pictured) which may be a zipper, button and buttonholes, hooks and eyes, or any other suitable closure method.

Figure 2:
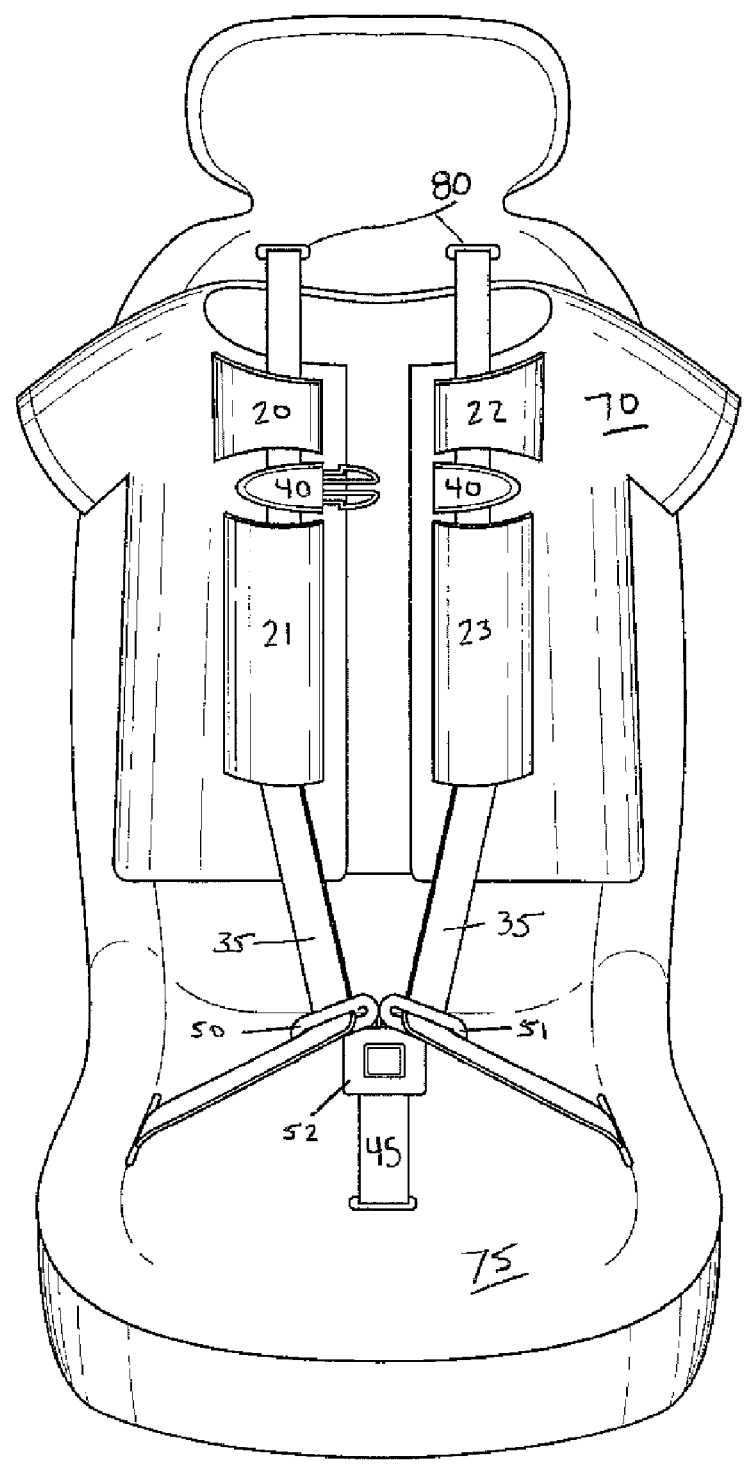
FIG. 2 depicts the garment as properly placed on the straps of a car seat.

To each of the front sides 30 is attached permanently an additional piece of material which has the function of receiving the chest straps 35 from the car seat 75, as depicted in FIG. 2. These additional pieces of material are depicted in FIG. 1 as being composed of a left upper piece 20, a left lower piece 21, a right upper piece 22, and a right lower piece 23, each of which is permanently sewn or attached to the front sides 30 on the sides parallel to the edges of the front sides 30 so as to admit vertically the chest straps 35 of the car seat 75. It is also conceivable and possible to consolidate the left upper piece 20 and left lower piece 21 (and separately, the right upper piece 22 and the right lower piece 23) into one long vertical piece of material, permanently attached as aforementioned except for an opening in the sewing alongside the interior of the front side 30 so as to admit the closure hasp 40 of the car seat 75 to remain exposed for fastening. Each of these additional pieces of material 20-23 should be wide enough so that, after being permanently attached to the garment 70 along the left and right edges, they are able to accept the full width of the chest straps 35 of the car seat 75 as well as the closure hasp 40 so that the chest straps 35 can be threaded through the material pieces 20-23 without undue difficulty. The chest straps 35 are also designed to be located across the wearer's upper chest, which is where most car seat manufacturers recommend the chest closure hasp 40 be placed for the child's safety. The design of the garment 70 thus also ensures that the car seat harness system is fastened correctly on the wearer.

Most car seats 75 are provided with multiple openings 80 in the back of the seat (as depicted in FIG. 2) to allow the chest straps 35 to be moved up and down in order to accommodate the changing height of a growing child. In accordance with the procedure which the manufacturer of the car seat 75 has proposed for making these adjustments, the chest straps 35 are generally disconnected from the rear of the car seat 75 which allows them to be threaded into the desired opening 80 in the back of the seat. Using this procedure, the chest straps 35 may be threaded through the material pieces 20-23 and then passed through the openings 80 in the back of the seat and then reconnected securely in the rear of the seat 75. This then makes the garment 70 a permanent part of the car seat 75, and is left in the car seat 75 until the user desires to remove the garment 70 by reversing the aforementioned procedure. The presence of the garment 70 does not impede nor diminish the effectiveness or safety of the 5-point harness system present in most modern car seats 75 as the closure hasp 40 remains available for fastening and as the garment 70 does not impede the function of the left buckle 50 and right buckle 51 located on the lower ends of the chest straps 35 as they are fastened into the buckle receiver 52 located on the crotch strap 45 of the car seat 75. As long as all buckles and straps are positioned and fastened correctly as recommended by the car seat manufacturer, there is no risk to the child properly using the garment 70.

Figure 3:
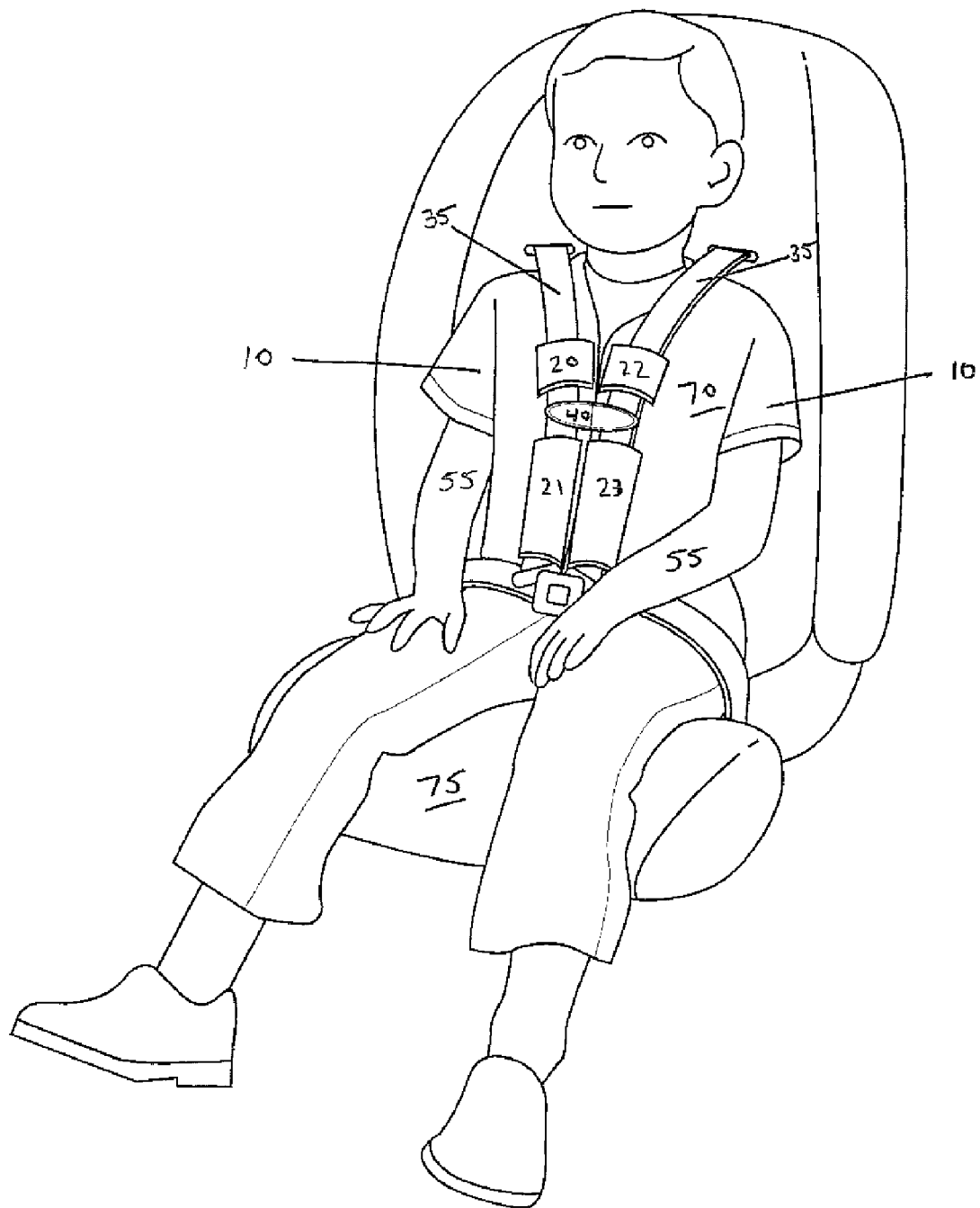
FIG. 3 depicts the garment in usage on a child when placed in the car seat.

Once the garment 70 is placed into the car seat 75 as depicted in FIG. 2, the child is now ready to be placed in the car seat as depicted in FIG. 3. The child's arms 55 are placed through the sleeves 10 of the garment 70, and then the closure hasp 40 is closed and locked and the left buckle 50 and right buckle 51 are placed into the buckle receiver 52 located on the crotch strap 45. With the child's arms 55 placed into the garment 70, the child is now unable to slip his arms 55 out from under the chest straps 35 due to the attachment of the garment 70 to the chest straps 35. Without the presence of the garment 70, an agile child can place their arms 55 under the chest straps 35 if the straps are loose or improperly placed, or if the child wriggles enough to accomplish it. The garment 70 thus serves its purpose in comfortably preventing the child's arms 55 from reaching this undesirable position, and has the additional benefits of being warm if designed for winter use and being difficult for a child to remove without the assistance of an adult. The previously described versions of the present invention have many advantages, including that the garment is cost-effective, likely costing no more than a jacket of similar size and material weight would in the retail arena; safe in that it does not impede or frustrate the purpose of the 5-point harness system located in most modern car seats; and effective in that it prevents the problem described above of an agile child removing her arms from the straps of a car seat and causing a dangerous and distracting problem to herself and the other passengers in the vehicle. Of course, the garment does not require that all the advantageous features and all the advantages need to be incorporated into every embodiment of the invention, but what has been presented is what is believed to be the best mode of all possible versions of the invention.

Although the present invention has been described in considerable detail with reference to certain preferred versions thereof, other variations are possible. For example, the garment 70 may be made from different patterns of material or adapted to use with other varieties of car seats, such as those not incorporating a 5-point harness system. Therefore, the spirit and scope of the appended claims should not be limited to the description of the preferred versions contained herein.

What is claimed is:

1. A garment for use with a child restraint seat, the garment comprising:
    a back;
    a front connected to the back, the front including a right portion and a left portion;
    two sleeves configured for admittance of a child's arms, wherein the front and the back are connected to the two sleeve so as to resemble a jacket-type garment; and
    four admittances formed in the front in vertically aligned pairs of two, each of the vertically aligned pairs being on each of the left portion and the right portion of the garment, each of said admittances permanently attached on vertical edges of each of the admittances, and each of the admittances being wide enough to accept passage of a child car-seat strap and with a gap in between each of said vertically-aligned pairs, each gap being wide enough to allow for complete exposure of a chest closure hasp of the car seat configured to be positioned over the chest of a child in the car seat.

2. The garment of claim 1, wherein the admittances are formed by pieces of fabric attached to the front.

3. The garment of claim 1, wherein the garment further comprises a collar.

4. The garment of claim 1, wherein fabric used in the construction of the garment is selected from fabrics of different colors and patterns.

5. The garment of claim 1, wherein the left and right portions of the front are configured to be fastened together by one or more of the following: a zipper, buttons, snaps, hooks, and hook and loop fasteners.

6. The garment of claim 1, wherein the garment is configured to be used with a car seat having a five-point harness with the chest closure hasp being configured to be located in the center of a chest of a child restrained in the car seat.

7. A garment for use with a child restraint car-seat, the garment comprising:
    two sleeves for admittance of the child's arms;
    a front having a left side and a right side;
    a back connected to the two sleeves and to the front so as to resemble a jacket-type garment; and
    two admittances formed in the front portion of the garment, each of the admittances being located on the left and right side of the front of the garment, each of the admittances forming a channel for passage of a car seat strap, the channel having an opening in one side configured to allow passage of a chest closure hasp extending generally perpendicular to the car seat strap, the opening being formed to provide positioning of the chest closure hasp over a chest of a child restrained in the car seat.

8. The garment of claim 7, wherein said sleeves of the garment are one of either short or long length.

9. The garment of claim 7, wherein the garment further comprises a collar.

10. The garment of claim 7, wherein the fabric used in the construction of the garment is selected from fabric of different colors and patterns to match the car seat.

11. The garment of claim 7, wherein the left and right sides of the front are configured to be fastened together by one or more of the following: a zipper, buttons, snaps, hooks, and hook and loop fasteners.

12. The garment of claim 7, wherein the garment is configured to be used with a car seat having a five-point harness with the chest closure hasp being configured to be located in the center of a chest of a child restrained in the car seat.

* * * * *